United States Patent [19]

Etlin

[11] Patent Number: 5,110,464
[45] Date of Patent: May 5, 1992

[54] APPARATUS FOR RECIRCULATION OF LIQUIDS

[76] Inventor: Vladimir Etlin, 7403 Lisle Ave., Falls Church, Va. 22043

[21] Appl. No.: 484,975

[22] Filed: Feb. 26, 1990

Related U.S. Application Data

[63] Continuation-in-part of Ser. No. 252,495, Sep. 30, 1988, abandoned.

[51] Int. Cl.$^5$ .............................................. C02F 3/22
[52] U.S. Cl. ................................. 210/195.3; 210/208; 210/219; 210/320
[58] Field of Search .................... 210/195.4, 197, 137, 210/195.1, 195.3, 201, 202, 208, 219, 220, 221.2, 320

[56] References Cited

U.S. PATENT DOCUMENTS

| | | | |
|---|---|---|---|
| 2,987,186 | 6/1961 | Burgoon et al. | 210/197 |
| 3,043,433 | 7/1962 | Singer | 210/197 |
| 3,204,768 | 9/1965 | Daniel | 210/197 |
| 3,385,444 | 5/1968 | Dufornet | 210/197 |
| 3,682,313 | 8/1972 | Abraham et al. | 210/197 |
| 3,709,363 | 1/1973 | Smart, IV et al. | 210/197 |
| 4,211,657 | 7/1980 | Etlin | 210/195.4 |

Primary Examiner—Thomas Wyse
Attorney, Agent, or Firm—Griffin Branigan & Butler

[57] ABSTRACT

A waste liquid treatment system (10) includes an aeration chamber (10A) and a settling chamber (13). an aerator (11) is disposed within the aeration chamber (10A). A conduit (12) delivers liquid from the aeration chamber (10A) to the settling chamber (13). A gas pocket (P) is provided in the aerating chamber (10A), with at least a portion of the gas pocket (P) being situated beneath the liquid level line ($L_{13}$) of the settling chamber (13). Conduits (18 and 19) are provided for delivering liquid from the settling chamber (13) to the aeration chamber (10A). The conduits (18 and 19) have respective outlets (24, 26) which empty into the gas pocket (P) at an elevation below the settling chamber liquid level line ($L_{13}$). In one embodiment, a gas pocket (P) is provided in the interior of a tubular component (23) of the aerator (11). In another embodiment, a gas pocket (P') is provided beneath a concave hood (32) which traps gas bubbles (30) introduced into an aeration chamber (110A). In another embodiment, a baffle (32) is provided in the aeration chamber (210A) to provide a quiescent zone (33) wherein sludge is allowed to float and thicken for subsequent removal.

6 Claims, 2 Drawing Sheets

APPARATUS FOR RECIRCULATION OF LIQUIDS

BACKGROUND

This application is a continuation-in-part application of U.S. Pat. application Ser. No. 07/252,495, filed Sep. 30, 1988, now abandoned

1. Field of Invention

This invention pertains to sewage treatment systems, and particularly to means for recirculating liquids and/or activated sludge in such systems as well as the collection and removal of excess sludge from such systems.

2. Prior Art and Other Considerations

U.S. Pat. No. 4,211,657 to Etlin describes a sewage treatment system wherein the recirculation of waste water and/or sludge among various chambers of the system is occasioned by a pressure differential created between the chambers. The extent of the pressure differential depends on various factors, including the water level differential between the chambers; the distance between the chambers; and the velocities of the liquid; and, the diameters of the passageways between chambers.

Other patents disclosing sewage treatment systems include U.S. Pat. Nos. 3,204,768 to Daniel; 3,682,313 to Abraham et al.; 3,709,363 to Smart et al.; 2,987,186 to Burgoon et al.; 4,436,632; 4,362,625; and 4,383,922 to Beard; 3,385,444 to Bufournet; and, 3,043,433 to Singer. Many of these patents disclose recirculation of liquid between chambers through conduits, with discharge ends of the conduits being submerged in liquid. Submersion of a discharge end of such a conduit requires displacement of liquid from around the discharge end. Accordingly, the velocity of recirculation of the liquid through the system is retarded, thereby reducing the efficiency of the system.

Others of these patents require expensive and cumbersome apparatus in order to induce a recirculation effect. Typically the required structures, such as an eductor or a special pump or the like, must be specially constructed and operated at high velocities in order to achieve recirculation. These constructional and operational constraints are uneconomical and can lead to operational problems.

Accordingly, it is an object of the present invention to provide a sewage treatment system and method of operation thereof which facilitates efficient recirculation of liquid through the chambers of the system.

An advantage of the present invention is the provision of a sewage treatment system and method of operation thereof which does not require the use of special liquid pumps or eductors.

A further advantage of the present invention is the provision of a sewage treatment system and method of operation thereof which is not as dependent upon the liquid level between chambers comprising the system, or of the distance between such chambers.

Yet another advantage of the present invention is the provision of a sewage treatment system and method of operation thereof from which excess sludge can be removed economically.

Yet another advantage of the present invention is the provision of a sewage treatment system which is easily constructed.

SUMMARY

A waste liquid treatment system includes an aeration chamber and a settling chamber. An aerator is disposed within the aeration chamber. A conduit delivers liquid from the aeration chamber to the settling chamber. A gas pocket is provided in the aeration chamber, with at least a portion of the gas pocket being situated beneath the liquid level line of the settling chamber. The gas pocket is in gaseous communication with the atmosphere.

A conduit is also provided for delivering liquid from the settling chamber to the aeration chamber. The conduit from the settling chamber has an outlet which empties into the gas pocket at an elevation below the settling chamber liquid level line.

In one embodiment, a gas pocket is provided in the interior of a tubular component of the aerator. The tubular component has its upper end positioned above the liquid level line of the aeration chamber. In another embodiment, a gas pocket is provided beneath a concave hood which traps gas bubbles introduced into an aerating chamber.

The fact that the outlet of the conduit leading from the settling chamber back to the aeration chamber communicates with a gas pocket facilitates the continuous free discharge of sludge from the settling chamber into the gas pocket. Accordingly, liquid need not be displaced from around the outlet of the conduit, thereby providing greater recirculating efficiency. Moreover, liquid recirculation will occur even when the liquid level line in the settling chamber is lower than the liquid level line of the aeration chamber, since the pressure at the outlet of the outlet of the conduit is less than the pressure at its inlet.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
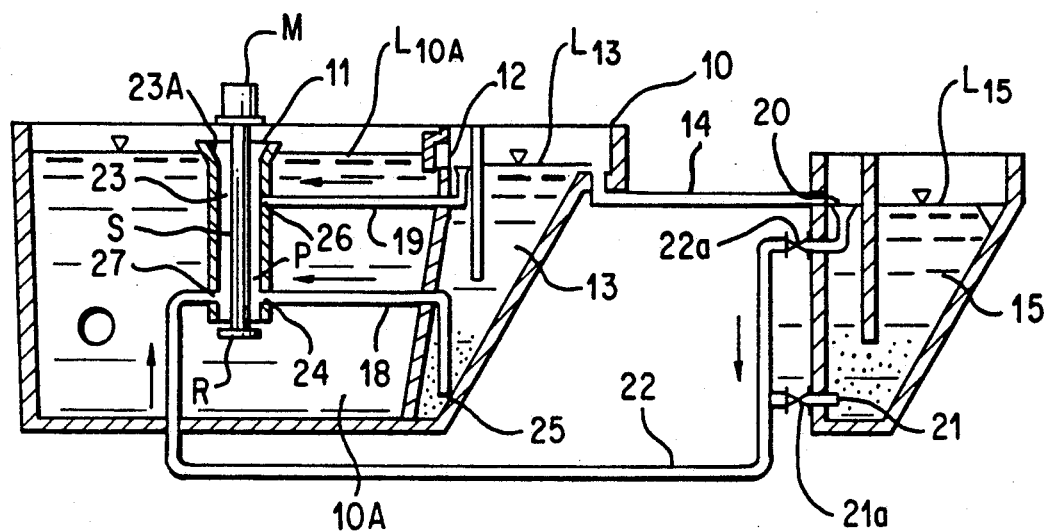
FIG. 1 is a schematic vertical sectional view of a sewage treatment system according to a first embodiment of the invention.
Figure 2:
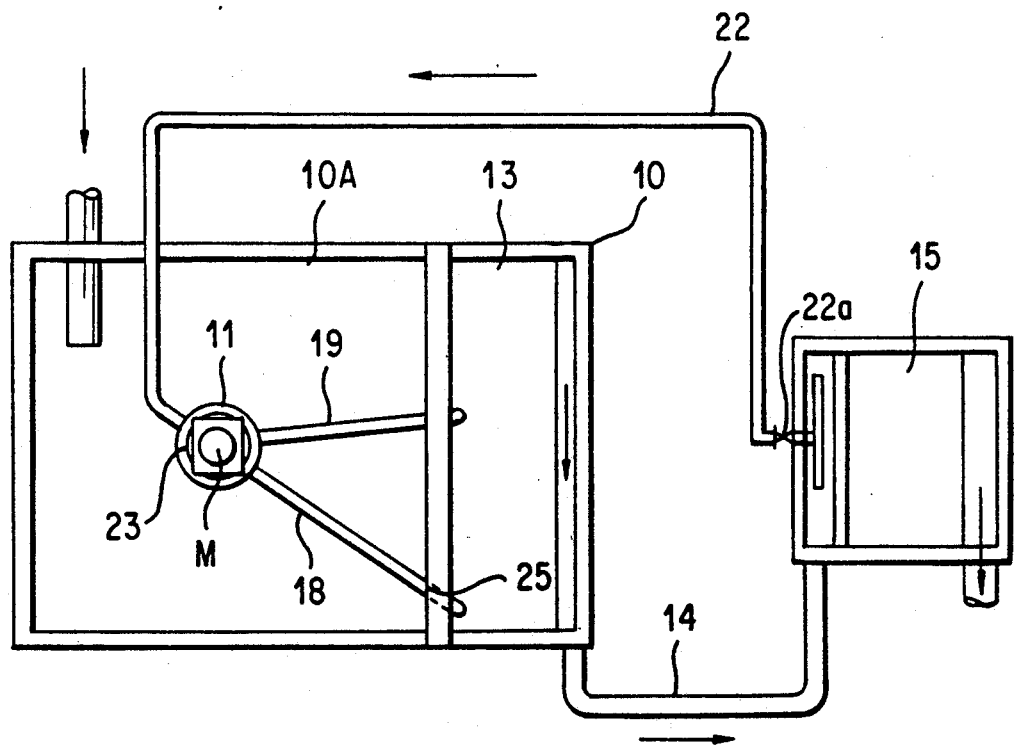
FIG. 2 is a top plan view of FIG. 1.

FIGS. 1 and 2 illustrate a first embodiment of sewage or waste liquid treatment system 10. Liquid treatment system 10 includes an aeration chamber 10A with an aerating element 11 disposed within the aeration chamber 10A. The aeration chamber 10A has a liquid level line denoted by reference character $L_{10A}$. As used herein, the term "liquid level line" encompasses any liquid level of a chamber as may be prescribed for operation of a waste treatment system. Near its liquid level line $L_{10A}$ the aeration chamber 10A has an outlet channel or conduit 12.

The liquid treatment system 10 further includes a first step settling chamber 13. Waste from aeration chamber 10A flows through outlet channel 12 into the first step settling chamber 13. A conduit 14 is provided for discharging treated liquid from chamber 13 to a separately situated second step settling chamber 15.

Waste liquid, such as waste water, is treated inside the system 10 in a well known biological manner. Activated sludge (not shown) first settles in the first settling chamber 13. Reference character $L_{13}$ denotes the level of liquid in the settling chamber 13.

Effluent from the chamber 13 enters the second settling chamber 15 through the conduit 14. Reference character $L_{15}$ denotes the level of liquid in the settling chamber 15. In the settling chamber 15 additional activated sludge is settled out.

Accumulation of solids from the settling chambers 13 and 15 can occur either at the liquid surface and/or at the bottoms of the settling chambers 13 and 15.

The aerator 11 includes an air passage tube 23. The air passage tube 23 has a circular open top 23A which extends above the liquid level line $L_{10A}$ of the aeration chamber 10A, so that liquid does not flow down into the air passage tube 23. The open top 23A of the air passage tube 23 communicates with the atmosphere, with the result that the tube 23 is substantially filled with gas (atmospheric air) rather than liquid.

The aerator 11 is surmounted by a motor M. The motor drives a shaft S which centrally depends through the air passage tube 23. A rotor R is mounted to the bottom of the shaft S. An annular pocket of air P exists between the interior wall of the air passage tube 23 and the shaft S. The rotor R is rotationally driven by the motor M.

Activated sludge from the bottom of chamber 13 is recycled back into the aeration chamber 10A through a conduit 18. Conduit 18 has ends 24 and 25. Conduit end 25 of conduit 18 is situated at the bottom of the chamber 13. End 24 of conduit 18 is situated inside the gas pocket P defined by a concentric air passage tube 23 of the aerator 11. At least a portion of the gas pocket P is beneath the second chamber liquid level line $L_{15}$. As mentioned above, the concentric air passage tube 23 is filled with air and is open to the atmosphere. That is, the top of the concentric air passage tube 23 extends above the liquid level line $L_{10A}$ of the aeration chamber 10A, so that liquid does not enter the top of the tube 23.

When the aerator 11 is operating, water which would otherwise be attempting to enter the lower end of the passage tube 23 is displaced by air impelled from the top of the tube 23 (from the atmosphere). The pocket is a region of lower pressure than the pressure existing at the inlet of the conduit. The pressure at end 24 of the conduit 18 is lower that at the conduit end 25, with the result that liquid entering tube 23 from conduit 18 is forced out the bottom of tube 23 and recycled back into chamber 10A.

Heavy solids in chamber 13 settle at the bottom of chamber 13. Other solids, such as grease and foam floating at the surface of liquid in the chamber 13, are recycled back into the aeration chamber 10A through a conduit 19. One end of conduit 19 is situated at the top of chamber 13, below the liquid level line $L_{13}$. The other end 26 of conduit 19 is situated inside the concentric air passage tube 23, allowing similar action as explained above with respect to conduit 18.

Activated sludge from the bottom of settling tank 15 is recycled back into the aeration chamber 10A through conduits 21 and 22. Conduit 21 has a first end thereof located at the bottom of chamber 15. A second end of conduit 21 communicates with conduit 22. A first end of conduit 22 is located near the surface of chamber 15. A second end of 27 of conduit 2 is situated inside of the concentric air passage tube 23. Solids floated at the surface of liquid in the chamber 15 are recycled back to the aeration chamber 10A through conduits 20 and 22. Valves 21a and 22a control the flow from the settling tank 15 to the aeration chamber 10A.

From a consideration of FIGS. 1 and 2 it will be apparent that no pumps are required for system 10. Only a single aerator 11 is necessary to provide sludge recycling from both settling chambers 13, 15 despite the fact chambers 13, 15 may have a water level substantially lower than that of the aeration chamber 10A.

Figure 3:
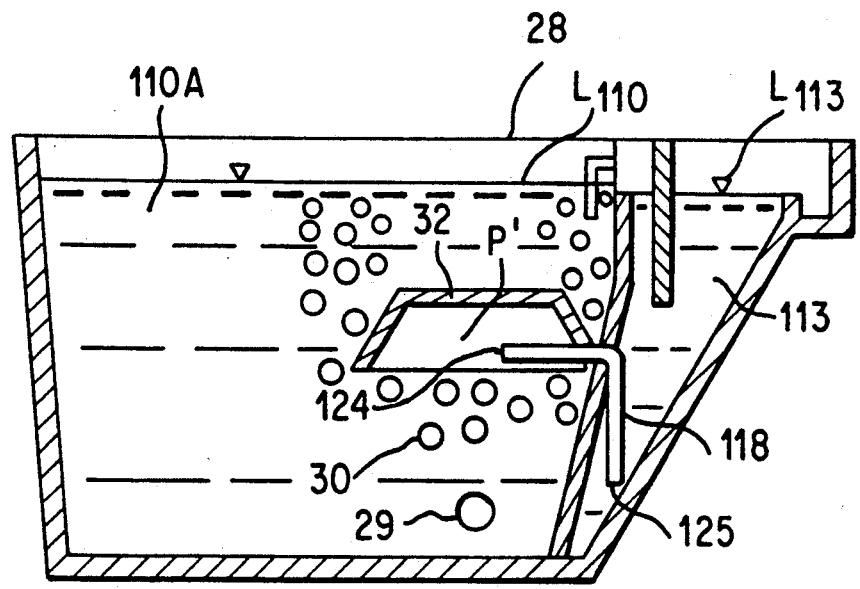
FIG. 3 is a schematic vertical sectional view of a sewage treatment system according to a second embodiment of the invention.

FIG. 3 shows a second embodiment of a waste liquid treatment system according to the invention, particularly waste liquid treatment system 28. Elements of system 28 corresponding to those of system 10 are designated by similar reference numerals with the additional prefix "1".

The system 28 of the embodiment of FIG. 3 differs from the system 10 of the embodiment of FIGS. 1 and 2 in several regards. The system 28 of the embodiment of FIG. 3 does not have a second settling chamber and does not have a mechanical aerator. As explained below, mixing and aeration for the system 28 is accomplished by the injection of gas at the bottom of aeration chamber 110A.

The system 28 of the embodiment of FIG. 3 includes an gas supply conduit 29 near the bottom of the aeration chamber 110A for introducing gas, such as compressed air, into the bottom of the aeration chamber 110A. A hood 32 is disposed in the chamber 110A above the conduit 29, so that gas bubbles 30 emitted from conduit 29 rise in a generally vertical direction.

The hood 32 has a generally concave shape facing the bottom of the chamber 110A, with the edge or rim of the hood 32 being situated below the liquid level line $L_{110}$ of the chamber 110A and below the liquid level line $L_{113}$ of the chamber 113. Accordingly, gas bubbles 30 emitted from conduit 29 are trapped beneath the hood 32 and form a steady gas pocket P' thereunder.

A conduit 118 has an outlet 124 which communicates with the interior of the gas pocket P' below the liquid level line $L_{113}$ of the settling chamber 113. An inlet 125 of conduit 118 is positioned at the bottom of the settling chamber 113. By virtue of the positioning of inlet 125 of conduit 118 in the settling chamber 113 and the outlet 124 in the interior of gas pocket P' under hood 32, sludge recirculation through conduit 118 occurs continuously by free discharge into the pocket P' (i.e., without requiring displacement of liquid around the outlet 124).

Figure 4:
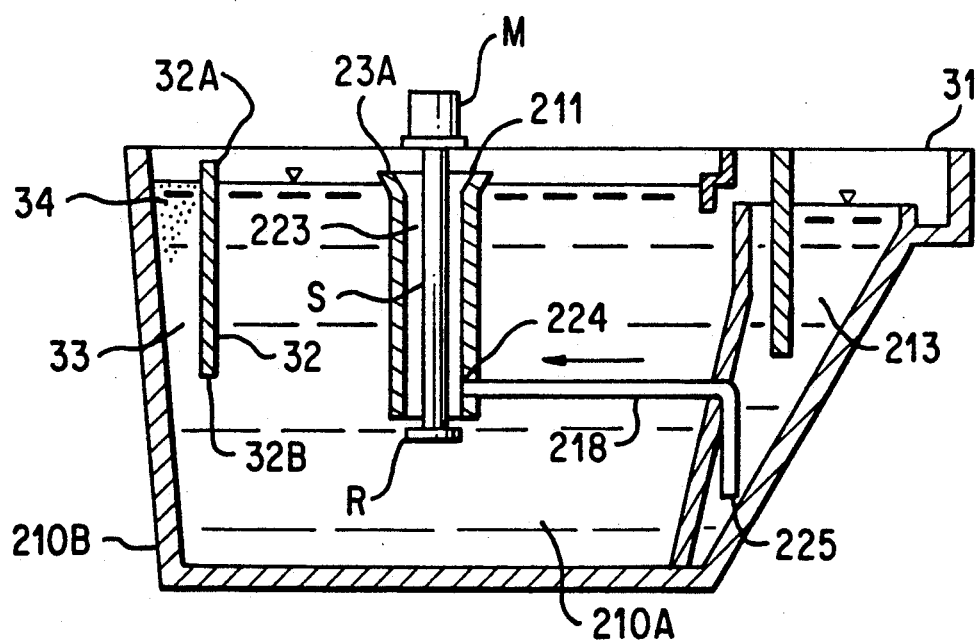
FIG. 4 is a schematic vertical sectional view of a sewage treatment system according to a third embodiment of the invention.

FIG. 4 shows a third embodiment of a waste liquid treatment system of the invention, particularly waste liquid treatment system 31. Elements of system 31 corresponding to those of system 10 are designated by similar reference numerals with the additional prefix "2".

The system 31 of the embodiment of FIG. 4 also differs from the system 10 of the embodiment of FIGS. 1 and 2 in several regards. The system 31 of the embodiment of FIG. 4 has a wall-like baffle 32 which defines a quiescent zone 33 within an aeration chamber 210A. The quiescent zone 33 exists between baffle 32 and a wall 210B of the aeration chamber 210A. As shown in FIG. 4, the baffle 32 is spaced away from wall 210B. Baffle 32 has an upper edge 32A which is positioned above the liquid level line of the chamber 210A and a lower edge 32B which is positioned below the liquid level line of the chamber 210A. It should be understood that additional baffles can be provided.

In operation of the system 31 of the embodiment of FIG. 4, the aerator 211 creates intense turbulence inside the chamber 210A. The turbulence keeps activated sludge in suspension. Some particles of the sludge attached to air bubbles reach the quiescent zone 33 and rise to the surface where the sludge builds up into a layer 34 of thickened sludge. The layer 34 of thickened sludge can be removed either continuously or periodically by conventional means for further disposal.

Thus it should be understood that the foregoing embodiments provide numerous advantages. The fact that the outlet of the conduit leading from the settling chamber back to the aeration chamber communicates with a gas pocket facilitates the continuous free discharge of sludge from the settling chamber into the gas pocket. Accordingly, liquid need not be displaced from around the outlet of the conduit, thereby providing greater recirculating efficiency. Moreover, liquid recirculation will occur even when the liquid level line in the settling chamber is substantially lower than the liquid level line of the aerating chamber, since the pressure at the outlet of the conduit is less than the pressure at its inlet. Liquid recirculation will occur even if the outlet of the conduit is at an elevation above the inlet of the conduit, so long as the outlet of the conduit is below the liquid level line of the chamber in which the conduit inlet is located.

While the invention has been particularly shown and described with reference to the preferred embodiments thereof, it will be understood by those skilled in the art that various alterations in form and detail may be made therein without departing from the spirit and scope of the invention. For example, any number of settling chambers can be provided, either in series or in parallel.

The embodiments of the invention in which an exclusive property or privilege is claimed are defined as follows:

1. Apparatus for treating liquids comprising:
   a first chamber for receiving liquid-to-be-treated, said first chamber being filled to a first-chamber liquid-level line;
   a second chamber filled to a second-chamber liquid-level line different from said first-chamber liquid-level line;
   first delivery means for delivering liquid from said first chamber to said second chamber whereby liquid is introduced into said second chamber;
   air communication means communicating with ambient air, said air communication means forming a sub-chamber within said first chamber;
   mixing means provided in said first chamber for mixing and aerating liquids;
   an air pocket in said sub-chamber wherein at least a portion of said air pocket is beneath said second-chamber liquid-level line; and,
   second delivery means for delivering liquid from said second chamber to said first chamber, said second delivery means having an outlet which empties into said air pocket at an elevation below said second-chamber liquid-level line.

2. The apparatus of claim 1, wherein said air communication means comprises a hollow member having a hollow interior included in said means for mixing and aerating liquid, and wherein the outlet of said second delivery means connects to said hollow interior of said hollow member at an elevation below said second-chamber liquid-level line.

3. The apparatus of claim 2, wherein said means for mixing and aerating liquid includes a rotatable impeller mounted at the lower end of said hollow member.

4. The apparatus of claim 1, further comprising means for controlling the flow from said second chamber to said first chamber.

5. The apparatus of claim 1, further comprising baffle means provided in said first chamber, said baffle means having a lower edge located below the first-chamber liquid-level line and an upper edge located above the first-chamber liquid-level line, said baffle means providing a quiescent zone in said first chamber between said baffle means and a wall of said first chamber whereby sludge particles attached to gas bubbles from said mixing means rise to the surface of said quiescent zone for removal therefrom.

6. The apparatus of claim 1, further comprising:
   a third chamber fillable to a third chamber liquid level line;
   means for delivering liquid to said third chamber whereby liquid is introduced into said third chamber; and,
   third delivery means for delivering liquid from said third chamber to said first chamber, said third delivery means having an outlet which empties into said gas pocket at an elevation below said third chamber liquid level line.

* * * * *